(12) United States Patent
Ernst

(10) Patent No.: US 11,050,110 B2
(45) Date of Patent: Jun. 29, 2021

(54) BATTERY ARRANGEMENT FOR A MOTOR VEHICLE AND MOTOR VEHICLE

(71) Applicant: AUDI AG, Ingolstadt (DE)

(72) Inventor: Michael Ernst, Wuestenrot (DE)

(73) Assignee: AUDI AG, Ingolstadt (DE)

( * ) Notice: Subject to any disclaimer, the term of this patent is extended or adjusted under 35 U.S.C. 154(b) by 146 days.

(21) Appl. No.: 16/486,395

(22) PCT Filed: Jan. 12, 2018

(86) PCT No.: PCT/EP2018/050729
§ 371 (c)(1),
(2) Date: Aug. 15, 2019

(87) PCT Pub. No.: WO2018/153564
PCT Pub. Date: Aug. 30, 2018

(65) Prior Publication Data
US 2020/0112006 A1 Apr. 9, 2020

(30) Foreign Application Priority Data
Feb. 21, 2017 (DE) ..................... 10 2017 202 743.6

(51) Int. Cl.
*H01M 4/02* (2006.01)
*H01M 50/20* (2021.01)
(Continued)

(52) U.S. Cl.
CPC .............. *H01M 50/20* (2021.01); *B60L 50/64* (2019.02); *H01M 50/317* (2021.01); *H01M 2220/20* (2013.01)

(58) Field of Classification Search
CPC ..................................................... H01M 4/02
See application file for complete search history.

(56) References Cited

U.S. PATENT DOCUMENTS

| 5,643,691 A | 7/1997 | Iwatsuki et al. |
| 8,663,824 B1 | 3/2014 | Frey et al. |

FOREIGN PATENT DOCUMENTS

| DE | 102007010740 A1 | 8/2008 |
| DE | 102011103998 A1 | 12/2012 |

(Continued)

OTHER PUBLICATIONS

German Examination Report dated Sep. 14, 2017 in corresponding German Application No. 10 2017 202 743.6; 20 pages.
(Continued)

*Primary Examiner* — Jacob B Marks
(74) *Attorney, Agent, or Firm* — Maier & Maier, PLLC

(57) ABSTRACT

A battery arrangement for a motor vehicle (10). The battery arrangement comprises a battery, which has a battery housing and at least one battery cell arranged in the battery housing, and at least one pressure-equalising element for reducing a pressure difference between a pressure in the interior of the battery housing and a pressure in the surroundings of the battery housing. The battery housing has at least one connection region having a passage opening in which at least one conduit of the battery arrangement through which air can flow is connected to the battery housing. The at least one pressure-equalizing element is arranged on the at least one conduit and provides an air throughflow surface of a size that is designed to limit the pressure difference to less than 10 mbar. The invention further relates to a motor vehicle having such a battery arrangement.

11 Claims, 1 Drawing Sheet

(51) Int. Cl.
*B60L 50/64* (2019.01)
*H01M 50/317* (2021.01)

(56) References Cited

FOREIGN PATENT DOCUMENTS

| | | | |
|---|---|---|---|
| DE | 102011015981 A1 | | 5/2013 |
| DE | 102013204585 | * | 9/2014 |
| DE | 102013204585 A1 | | 9/2014 |
| DE | 102013213909 A1 | | 1/2015 |
| EP | 2757612 A1 | | 7/2014 |
| JP | 2013039006 A | | 2/2013 |
| WO | 2014/195648 A1 | | 12/2014 |
| WO | WO 2014195648 | * | 12/2014 |

OTHER PUBLICATIONS

International Search Report and Written Opinion dated Apr. 18, 2018 in corresponding International Application No. PCT/EP2018/050729; 22 pages.

English-translation of International Preliminary Report on Patentability dated Sep. 6, 2019 in corresponding International Application No. PCT/EP2018/050729; 9 pages.

* cited by examiner

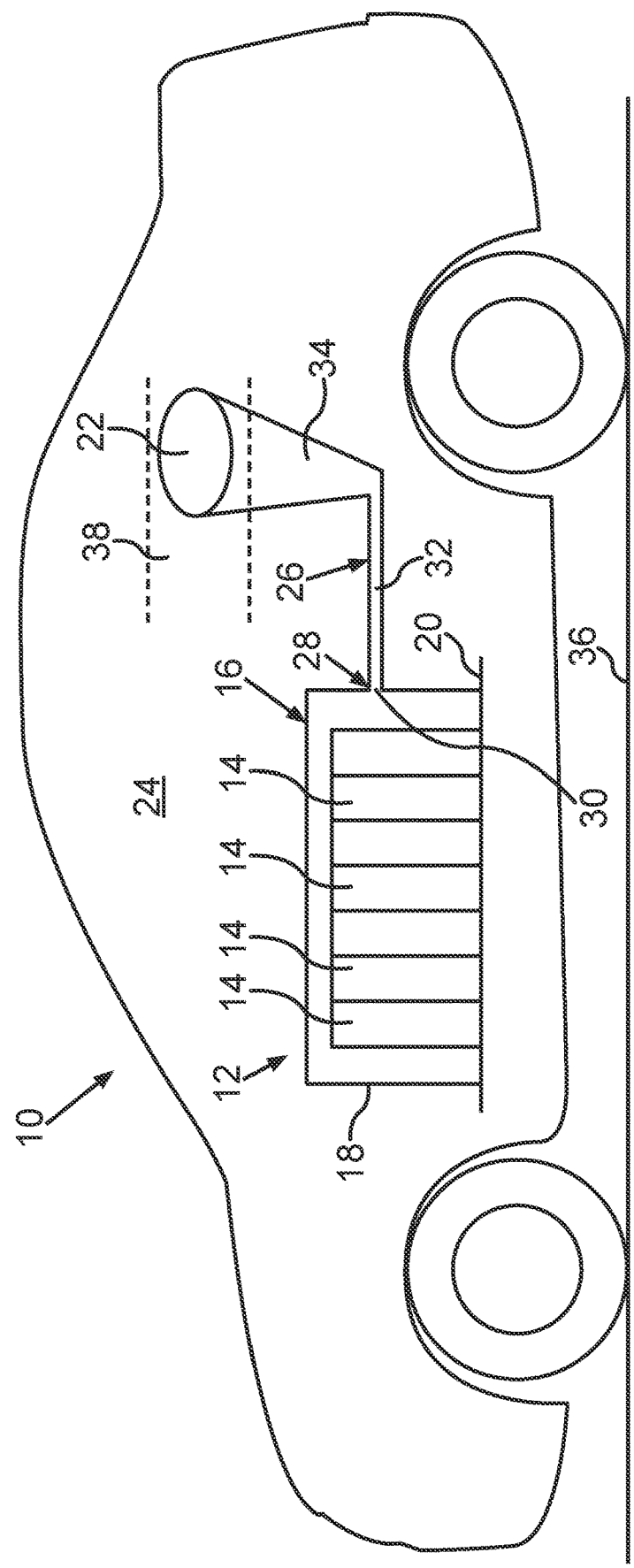

BATTERY ARRANGEMENT FOR A MOTOR VEHICLE AND MOTOR VEHICLE

FIELD

The invention relates to a battery arrangement for a motor vehicle with a battery comprising a battery housing and at least one battery cell arranged in the battery housing, and with at least one pressure equalizing element for reducing a pressure difference between a pressure in the interior of the battery housing and a pressure in the surroundings of the battery housing. The battery housing comprises at least one connection region with a through opening in which region at least one conduit of the battery arrangement through which air can flow is connected to the battery housing. The at least one pressure equalizing element is arranged on at least one conduit. Furthermore, the invention relates to a motor vehicle with such a battery arrangement.

BACKGROUND

Change in the drive technology is currently taking place in the automobile industry. The tendency here is to use an electrified drive technology more and more. To this end, larger and larger and more powerful batteries are used in order to make possible corresponding ranges of the motor vehicle. Battery housings currently on the market are sealed and comprise pressure equalizing elements. The pressure equalizing elements allow the overpressure arising in the interior of the battery housing to escape, e.g., during a cell degassing of an overheating battery cell. Such a collapse of a battery module or of a battery cell in the battery module, which comprises a plurality of battery cells, therefore does not result in a bursting of the battery housing.

DE 10 2013 213 909 A1 describes a device for regulating the internal pressure in the battery housing comprising an equalizing conduit. The equalizing conduit is closed by a membrane. Non-return valves arranged in the equalizing conduit ensure that a pressure compensation via the equalizing conduit only takes place at a pressure difference between the internal pressure and the external pressure of more than 50 mbar. No pressure equalization should take place at lower pressure differences in order to not make possible the penetration of moisture into the battery housing by such a pressure equalization. Furthermore, the device comprises a degassing conduit with a bursting membrane.

The membrane, which serves as a pressure equalizing element and closes the equalizing conduit, therefore does not react in the battery described in DE 10 2013 213 909 A1 until a minimum pressure has been exceeded. Therefore, a pressure rise or pressure drop takes place in the battery housing up to this minimum pressure.

The circumstance is to be considered as disadvantageous here that the significant pressure differences between the interior of the battery housing and the surroundings of the battery housing also entail a stressing of seals of the battery housing. This is especially critical if the seals are simultaneously exposed to a comparatively large thermal stressing.

Based on the previously described boundary conditions, the complete battery housing is preferably additionally designed in such a manner for the sake of safety that it resists possible overpressures and underpressures. This, in turn, makes it necessary to seal the battery housing thoroughly well in order to protect the battery housing from being penetrated by moisture.

For example, in battery housings used by the manufacturer Tesla, a sealing flange is provided between an upper housing part and a lower housing part of the battery housing in a complete manner with a hardening adhesive such as is used in car manufacturing, for example, for adhering front panes to the body. In this case, if a repair to components arranged in the battery housing is required, the hardened adhesive material must be mechanically destroyed in order to gain access to the interior of the battery housing. This is usually also associated with a destruction of a cover of the housing or of other housing walls and is therefore disadvantageous.

SUMMARY

The present invention has the task of providing a battery arrangement for a motor vehicle in which a simplified seal of the battery housing can be realized and of providing a motor vehicle with such a battery arrangement.

The battery arrangement of the invention for a motor vehicle comprises a battery comprising a battery housing and at least one battery cell arranged in the battery housing. At least one pressure equalizing element of the battery arrangement serves to reduce a pressure difference between a pressure in the interior of the battery housing and a pressure in the surroundings of the battery housing. The battery housing comprises at least one connection region with a through passage opening. At least one conduit of the battery arrangement through which air can flow is connected in the connection region to the battery housing. The at least one pressure equalizing element is arranged on the at least one conduit and provides a surface through which air can flow and which is designed to limit the pressure difference to less than 10 mbar.

Therefore, it can be ensured by such a pressure equalizing element with the comparatively large surface through which air can flow and by providing a correspondingly large number of pressure equalizing elements which, taken together, provide this surface, that large pressure differences or pressure differences between the pressure in the interior of the battery housing and the pressure in the surroundings of the battery housing do not occur. Rather, it can be ensured in this manner that the pressure in the battery housing always corresponds approximately to the pressure in the surroundings of the battery housing. This allows a sealing concept to be realized for the battery housing which can be realized in an especially simple and economical manner Such a sealing concept especially allows the battery housing to be readily opened and closed again in case of a repair of the battery housing.

Therefore, it can be ensured by the corresponding dimensioning of the at least one pressure equalizing element that given pressure changes in the battery housing related to the pressure in the surroundings, there is always an exchange of air and/or of air passing through the at least one pressure equalizing element. This can prevent that seals or seal regions are loaded with an undesired high pressure.

This is based on the recognition that there are sealing materials which retain their sealing qualities when loaded with heat on the one hand or when loaded with pressure on the other hand. However, if a simultaneous loading of the sealing material with pressure and heat occurs, this can lead to a reduction or even a loss of the sealing function of the sealing material. However, a loading with heat can occur, for example, when charging the battery or if the motor vehicle provided with the battery arrangement is exposed (especially when parked) to strong solar radiation. However, a discharging of the battery during the operation of the motor vehicle also results in an elevation of the battery temperature.

Thermal loading of the battery can therefore not be prevented. However, in the present case, based on the size of the surface through which air can flow of the at least one pressure equalizing element, it can be ensured that the pressure difference between the pressure in the interior of the battery housing and the pressure in the surrounding of the battery housing remains extremely low.

It is also possible in this manner to take pressure variations into account which occur, for example, when traveling in mountains or during a transport by airplane of the motor vehicle equipped with the battery arrangement. In addition, temperature differences can have an effect on the pressure prevailing in the interior of the battery housing. However, it is always ensured in the present case that too great a pressure difference is not adjusted in the interior of the battery housing relative to the pressure in the surroundings of the battery housing.

The at least one pressure equalizing element is tight in particular against liquid water. This ensures that no water penetrates into the battery housing during the passage of air through the at least one pressure equalizing element, which can be caused by an underpressure in the battery housing. For example, the at least one pressure equalizing element can be constructed as a membrane or can comprise a membrane like the one obtainable, for example, under the designation Gore-Tex.

The surface size is preferably designed to limit the pressure difference to approximately 2 mbar to 3 mbar. The advantages associated with this for keeping the pressure difference as low as possible are then present to a considerable extent.

The surface is preferably greater than the greatest cross section through which the air can flow which the at least one conduit through which air can flow comprises in a conduit section bordering on the connection region. As a result, the conduit only needs to have a comparatively small cross section for the flow-through in the connection area and nevertheless a pressure equalizing element with an especially large surface can be made available in this conduit which element ensures an especially rapid reduction of the pressure difference. This ensures a simple design of the battery arrangement.

Additionally or alternatively, the battery housing can comprise a plurality of connection regions in which conduits through which air can flow and comprising pressure equalizing elements are connected to the battery housing. The surfaces of the particular pressure equalizing elements then do not have to be larger than the cross sections of the conduits which can be flowed through and nevertheless an especially large surface can be made available on the whole by the pressure equalizing elements. This large surface of the pressure equalizing elements ensures for its part the limiting of the pressure difference to an especially low value. However, the conduits can still have a substantially uniform cross section which can be flowed through. This makes the design of the conduits especially inexpensive.

The flowthrough cross section of the at least one conduit can increase toward a mouth region of the conduit, wherein the at least one pressure equalizing element is arranged in the mouth region of the conduit. In particular, the mouth area of the conduit can be closed by the pressure equalizing element. The conduit can widen out like a funnel in particular toward the mouth region and in this way it makes possible in a simple manner the arranging of the pressure equalizing element with the especially large surface which can be flowed through by air. Therefore, many conduits do not need to be provided and nevertheless the pressure equalizing element can be readily made available with the desired large surface in a region favorable for the arrangement of the pressure equalizing element.

Additionally or alternatively, the at least one conduit can comprise a plurality of outlets for the air which are closed by a plurality of the pressure equalizing elements. Therefore, for example, a conduit can comprises several outlets in an end area which are closed by the pressure equalizing elements. Also, the large surface can be made available in an especially simple manner in this way which can be flowed through by air and the pressure difference is maintained low. However, it can also be provided to this end that a conduit branches off to a plurality of outlets and that the particular pressure equalizing elements are arranged in particular at the ends of these branches.

The battery housing can comprise an upper part and a lower part, wherein the upper part is sealed against the lower part by at least one elastic sealing element. Such an elastic sealing element makes possible in particular a simple opening of the battery housing, for example, for the purpose of a repair or maintenance on the battery without the sealing element being damaged. For example, a butyl-based adhesive can be used as sealing element. Such an adhesive remains elastic even after the hardening.

The motor vehicle according to the invention comprises at least one battery arrangement according to the invention.

The at least one pressure equalizing element is preferably arranged here in a region on the at least one conduit which region is arranged in a space of the motor vehicle protected from being loaded with liquid water. Such a dry space ensures that the pressure equalizing element is protected from precipitation water, spray water or the like and can therefore bring about the pressure compensation in an especially reliable manner. In addition, this also avoids in an especially extensive manner a contamination or other adverse influencing of the at least one pressure equalizing element.

For example, the space can be designed as a hollow space in a body part of the motor vehicle. In this manner, the at least one conduit can run into the hollow space of a longitudinal carrier or of a sillboard of the motor vehicle. The desired large surface of the pressure equalizing element can be provided here especially well.

Additionally or alternatively, the space can be constructed as a loading space of the motor vehicle because the pressure equalizing element can also be arranged in a simple and low-cost manner in the loading space.

The loading space is preferably designed as a space which cannot be accessed from a passenger compartment of the motor vehicle because it is then ensured that fluids exiting via the at least one conduit from the battery cannot pass, for example, during a degassing of the at least one battery cell into the passenger compartment.

The advantages and preferred embodiments described for the battery arrangement according to the invention also apply to the motor vehicle according to the invention and vice versa.

BRIEF DESCRIPTION OF THE DRAWING

An exemplary embodiment of the invention is described in the following. To this end, the FIGURE shows in a very schematic manner a motor vehicle with a high-voltage battery, wherein a ventilation conduit runs away from a battery housing of the high-voltage battery on which conduit a large-surface membrane is arranged.

The FIGURE shows in a very schematic manner a motor vehicle with a high-voltage battery.

DETAILED DESCRIPTION

The exemplary embodiment explained in the following is a preferred embodiment of the invention. In the exemplary embodiment the described components of the embodiment constitute individual features of the invention which are to be considered independently of each other and which further develop the invention even independently of each other and therefore are to be considered even individually or in a different combination than the one shown as components of the invention. Furthermore, the described embodiment can also be supplemented by other features of the invention which were already described.

The FIGURE shows a very schematic view of a motor vehicle 10 constructed, for example as an electric vehicle or a hybrid vehicle. Accordingly, the motor vehicle 10 comprises a battery 12 constructed in this instance as a high-voltage battery. The battery 12 provides a nominal voltage of more than 60 V, for example, a nominal voltage of approximately 300 V to approximately 600 V. To this end, the battery 12 comprises a plurality of battery cells 14 which are electrically connected in series and/or in parallel. The battery cells 14 are arranged in a battery housing 16 comprising, for example, an upper part 18 formed like a hood and a lower part 20. In variants of a battery arrangement comprising the battery 12 the lower part 20 can be constructed like a pan and the upper part 18 like a cover.

In the present case a pressure equalizing element approximately in the form of a membrane 22 ensures that no overpressure or underpressure relative to the surroundings 24 of the battery housing 16 builds up inside the battery housing 16. In order to ensure this, the membrane 22 comprises a comparatively large surface through which air can flow. However, such a large-area membrane 22 is difficult to house or attach in the area of the battery housing 16. In particular, it is difficult to arrange a large-area membrane 22 on the battery housing 16 in such a manner that the membrane 22 is not exposed to any environmental influences such as being loaded with water, dirt or the like.

In order to nevertheless ensure that the membrane 22 is designed with a large area, the membrane 22 is arranged in the present case on a conduit 26 which serves as a ventilation tube. It can preferably be ensured by the membrane 22 that the pressure difference between the pressure inside the battery housing 16 and in the surroundings 24 of the battery housing 16 does not exceed a value of about 2 mbar to 3 mbar.

The conduit 26 is connected in a connection area 28 to the battery housing 16. The battery housing 16 comprises a through opening 30 in the connection area 28. In the present case, the line 26 has a comparatively small cross section for flowthrough in a conduit section 32 of the conduit 26 adjacent to the connection area 28. For example, a diameter of the conduit 26, which can also be designed as a flexible hose, can be on the order of approximately 1 cm in this conduit section 32.

In the present case the flowthrough cross section of the conduit 26 enlarges in a mouth area 34 of the line 26. For example, the mouth area 34 can be constructed with a funnel shape. If, as is shown by way of example in the present case, the membrane 22 closes the mouth area 34, this can provide an especially large surface of the membrane 22.

In some variants several conduits 26 or similar ventilation tubes can be connected at particular connection areas 28 into the battery housing 16 and run to particular membranes 22. Also, an individual conduit 26 can comprise a plurality of outlets, for example, in the shape of radial passage openings and an axial outlet at the end of the conduit 26. These outlets can be closed by particular pressure equalizing elements or membranes 22. A correspondingly large membrane surface is then made available by the plurality of membranes 22.

The ventilation tubes for which are represented by the conduit 26 in the FIGURE, preferably ventilate into a dry area of the motor vehicle 10. Such a dry area is preferably arranged higher in the motor vehicle 10 than areas of the motor vehicle 10 which are underwater if the motor vehicle 10 travels through water. In particular, such a dry area can be located more than 50 centimeters from a road 36 on which the motor vehicle 10 is located. However, such a dry area is preferably not inside the passenger cell or the passenger compartment of the motor vehicle 10. For example, a ventilation can take place via the conduit 26 into a loading space or trunk space of the motor vehicle 10.

Additionally or alternatively, such a space of the motor vehicle 10, which space is protected from being loaded by liquid water can be constructed as a hollow space of a body part 38 of the motor vehicle 10. The body part 38 is preferably shown only schematically and in sections. For example, the body part 38 can be a longitudinal carrier, a sillboard or the like. Therefore, the battery housing 16 can be ventilated in a controlled manner via the conduit 26 into the dry area located higher in the body. If the membrane 22 is constructed, for example, as a Gore-Tex membrane, it is simultaneously ensured that no penetration of moisture into the battery housing 16 occurs in the case of air movements due to an overpressure or underpressure.

It is ensured by the large dimensioning of the membrane 22 and/or of a plurality of such membranes 22 and/or of pressure equalizing elements that pressure changes occurring during the travel operation of the motor vehicle 10 or during the charging of the battery 12 which are occasioned by an elevation of the temperature of the battery 12 lead to a pressure compensation. Therefore, the battery housing 16 is ventilated via the at least one conduit 26 when the air in the battery housing 16 heats up. This takes place before sealing areas or seals are loaded with an undesirably high pressure. Such seals can be provided in particular between the upper part 18 and the lower part 20 of the battery housing 16.

In the present case, the large surface of the at least one membrane 22 therefore ensures that the pressure difference between the pressure in the interior of the battery housing 16 and in the surroundings 24 of the battery housing 16 is maintained very low. As a consequence, the battery housing 16 can be realized with an especially simple and advantageous sealing concept. Also, the battery housing 16 can be readily opened in case of a repair and subsequently closed again.

On the whole, the example shows how an improved ventilation of the battery housing 16 can be achieved by the invention.

The invention claimed is:

1. A battery arrangement for a motor vehicle with a battery, comprising:
   a battery housing with at least one battery cell arranged in the battery housing, and at least one pressure equalizing element for reducing a pressure difference between a pressure in the interior of the battery housing and a pressure in the surroundings of the battery housing,
   wherein the battery housing comprises at least one connection region with a through opening in which region at least one conduit of the battery arrangement through which air can flow is connected to the battery housing, wherein a flowthrough cross section of the at least one conduit increases towards a mouth region of the conduit, and the at least one pressure equalizing element is arranged in the mouth region, wherein the at least one pressure equalizing element provides a surface through which air flows into or out of the battery housing in response to the pressure difference.

2. The battery arrangement according to claim 1, wherein the size of the surface is configured such that air flows into or out of the battery housing when the pressure difference is at least 2 mbar.

3. The battery arrangement according to claim 1, wherein the surface is greater than the greatest cross section through which air can flow which the at least one conduit through which air can flow comprises in a conduit section adjacent to the connection area.

4. The battery arrangement according to claim 1, wherein the battery housing comprises a plurality of connection regions in which conduits through which air can flow and comprising pressure equalizing elements are connected to the battery housing.

5. The battery arrangement according to claim 1, wherein the at least one conduit comprises a plurality of outlets for the air which are closed by a plurality of the pressure equalizing elements.

6. The battery arrangement according to claim 1, wherein the battery housing comprises an upper part and a lower part, wherein the upper part is sealed against the lower part by at least one elastic sealing element.

7. The battery arrangement according to claim 1, wherein the size of the surface is configured such that air flows into or out of the battery housing when the pressure difference is at least 10 mbar.

8. A motor vehicle with at least one battery arrangement for a motor vehicle with a battery, comprising:

a battery housing with at least one battery cell arranged in the battery housing, and at least one pressure equalizing element for reducing a pressure difference between a pressure in the interior of the battery housing and a pressure in the surroundings of the battery housing, wherein the battery housing comprises at least one connection region with a through opening in which region at least one conduit of the battery arrangement through which air can flow is connected to the battery housing, wherein a flowthrough cross section of the at least one conduit increases towards a mouth region of the conduit, and the at least one pressure equalizing element is arranged in the mouth region, wherein the at least one pressure equalizing element provides a surface through which air flows into or out of the battery housing in response to the pressure difference, wherein the mouth region is arranged in a space of the motor vehicle protected from being loaded with liquid water.

9. The motor vehicle according to claim 8, wherein the space is designed as a hollow space of a body part of the motor vehicle and/or as a loading space of the motor vehicle.

10. The motor vehicle according to claim 9, wherein the loading space is designed as a space which cannot be accessed from a passenger compartment of the motor vehicle.

11. The motor vehicle according to claim 8, wherein the size of the surface is configured such that air flows into or out of the battery housing when the pressure difference is at least 10 mbar.

* * * * *